(12) United States Patent
Smuglyy (10) Patent No.: US 10,762,279 B2
(45) Date of Patent: Sep. 1, 2020

(54) METHOD AND SYSTEM FOR AUGMENTING TEXT IN A DOCUMENT

(71) Applicant: YANDEX EUROPE AG, Lucerne (CH)

(72) Inventor: Arseniy Ivanovich Smuglyy, Novosibirsk (RU)

(73) Assignee: YANDEX EUROPE AG, Lucerne (CH)

( * ) Notice: Subject to any disclaimer, the term of this patent is extended or adjusted under 35 U.S.C. 154(b) by 103 days.

(21) Appl. No.: 15/510,504

(22) PCT Filed: Sep. 22, 2015

(86) PCT No.: PCT/IB2015/057312
§ 371 (c)(1),
(2) Date: Mar. 10, 2017

(87) PCT Pub. No.: WO2016/156943
PCT Pub. Date: Oct. 6, 2016

(65) Prior Publication Data
US 2018/0232343 A1  Aug. 16, 2018

(30) Foreign Application Priority Data

Mar. 31, 2015 (RU) ................................. 2015111653

(51) Int. Cl.
*G06F 40/14* (2020.01)
*G06F 40/166* (2020.01)
*G06F 40/221* (2020.01)

(52) U.S. Cl.
CPC ............ *G06F 40/14* (2020.01); *G06F 40/166* (2020.01); *G06F 40/221* (2020.01)

(58) Field of Classification Search
CPC .................................................. G06F 17/211
(Continued)

(56) References Cited

U.S. PATENT DOCUMENTS 6,981,211 B1 * 12/2005 Claussen ............. G06F 16/9027
715/239
7,752,222 B1 * 7/2010 Cierniak ............... G06F 16/951
707/769
(Continued)

FOREIGN PATENT DOCUMENTS

CN   103116592 A   5/2013
RU   2351007 C2   3/2009
(Continued)

OTHER PUBLICATIONS

International Search Report from PCT/IB2015/057312, Shane Thomas, dated Feb. 2, 2016.
(Continued)

*Primary Examiner* — Andrew R Dyer
(74) *Attorney, Agent, or Firm* — BCF LLP (57) ABSTRACT

A method of augmenting presentation of text in a document includes obtaining a DOM tree associated with a markup of the document, searching a plurality of nodes of the DOM tree for a target text string such that a child node is searched after searching a corresponding parent node. A target text node of the DOM tree is identified, the target text node including an entirety of the target text string and having no child nodes including the entirety of the target text string. Responsive to identifying the target text node, the markup is modified in one of: the target text node and a child node of the target text node including a portion of the target text string. The markup is modified to augment presentation of the target text string in the document. A system for augmenting presentation of text in a document is also disclosed.

15 Claims, 6 Drawing Sheets

(58) Field of Classification Search
USPC .......................................................... 715/234
See application file for complete search history.

(56) References Cited

U.S. PATENT DOCUMENTS

| | | | |
|---|---|---|---|
| 7,835,504 | B1 | 11/2010 | Donald et al. |
| 8,667,015 | B2 | 3/2014 | Jiao et al. |
| 8,751,484 | B2 * | 6/2014 | Dexter .................. G06F 16/93 707/722 |
| 8,768,928 | B2 | 7/2014 | Ayoub et al. |
| 8,775,467 | B2 | 7/2014 | Dicke et al. |
| 2002/0065820 | A1 | 5/2002 | Enns |
| 2006/0167913 | A1 | 7/2006 | Tam et al. |
| 2008/0133599 | A1 | 6/2008 | Stewart et al. |
| 2010/0083095 | A1 | 4/2010 | Nikovski et al. |
| 2011/0119262 | A1 | 5/2011 | Dexter et al. |
| 2011/0173527 | A1 | 7/2011 | Zunger |
| 2013/0155463 | A1 | 6/2013 | Jin et al. |
| 2013/0227391 | A1 * | 8/2013 | Lim ................... G06F 16/9577 715/234 |
| 2014/0380147 | A1 | 12/2014 | Huang et al. |
| 2017/0011284 | A1 * | 1/2017 | Ohashi ................. G06F 3/1206 |

FOREIGN PATENT DOCUMENTS

| | | |
|---|---|---|
| WO | 2004068320 A2 | 8/2004 |
| WO | 2010078475 A2 | 7/2010 |

OTHER PUBLICATIONS

English abstract of CN103116592 retrieved from Espacenet on May 24, 2016.
Jasper, Convert < address > tags into Google Map link using jQuery, Mike Does Web, Jun. 29, 2011, http://www.mikedosweb.com/2011/convert-address-tags-into-google-map-link-using-jquery/, retrived from the internet on Nov. 15, 2016.
Geng, Extracting Content for News Web Pages based on DOM, IJCSNS International Journal of Computer Science and Network Security, vol. 7 No. 2, Feb. 2007, pp. 124-129.
Extract Postal Addresses from Web Pages, in the browser, ziprip. js—Extract Postal Addresses from Web Pages, http://zipripjs.com/, Nov. 15, 2016, 3 pages.
Cai, Extracting Content Structure for Web Pages based on Visual Representation, 12 pages.
Yu, High Accurancy Postal Address Extraction From Web Pages, Submitted in partial fulfillment of the requirements for the degree of Master of Computer Science at Dalhousie University Halifax, Nova Scotia, Mar. 2007, 61 pages.
Chang et al., MapMarker: Extraction of Postal Addresses and Associated Information for General Web Pages, pp. 1-8.

* cited by examiner

TO:
FROM:
CC:
SUBJECT:

Toronto (/tə'rɒntoʊ/) is the most populous city in Canada.

METHOD AND SYSTEM FOR AUGMENTING TEXT IN A DOCUMENT

CROSS-REFERENCE

The present application claims priority to Russian Patent Application No 2015111653, filed Mar. 31, 2015, entitled "METHOD AND SYSTEM FOR AUGMENTING TEXT IN A DOCUMENT" the entirety of which is incorporated herein.

FIELD

The present technology relates to methods and systems for augmenting presentation of text in a document.

BACKGROUND

Information is presented to users in various kinds of electronic documents such as e-mail messages, text messages, web pages, and the like. Electronic documents can include different types and formats of content, such as photos, video, audio and the like, related to a wide range of topics, such as but not limited to news, weather, traffic, entertainment, finance and the like. Electronic documents are accessed using a wide range of electronic devices such as desktop computers, laptop computers, smartphones, tablets and the like.

It is often desirable to attach supplemental information to portions of the text. For example, in an email invitation to a party, it may be desirable to attach a link to a map of the location of the party. This can be done by including the map within the displayed content of the email body, or by including the map as a link from the address. An advantage of providing the map of the location as a selectable link from the address is that the email invitation can be brief displaying only the most relevant information to all receivers, while also providing the option of easily retrieving supplemental information to users who may be desirous of the supplemental information.

There is thus a need for a convenient and efficient method and system for identifying and modifying portions of text in an electronic document.

SUMMARY

It is an object of the present technology to ameliorate at least some of the inconveniences present in the prior art.

Embodiments of the present technology have been developed based on inventors' appreciating that there exists at least one problem or an area for improvement associated with the prior art solutions.

As such, according to a first broad aspect of the present technology, there is provided a method of augmenting presentation of text in a document. The method is executable at a server. The method includes obtaining a DOM tree associated with a markup of the document, and searching a plurality of nodes of the DOM tree for a target text string such that a child node is searched after searching a corresponding parent node. A target text node of the DOM tree is identified, the target text node including an entirety of the target text string and having no child nodes including the entirety of the target text string. Responsive to identifying the target text node, the markup is modified in one of: the target text node and a child node of the target text node including a portion of the target text string. The markup is modified to augment presentation of the target text string in the document.

In some implementations, searching the plurality of nodes of the DOM tree for the target text string such that the child node is searched after searching the corresponding parent node includes searching the child node responsive to the corresponding parent node including the entirety of the target text string.

In some implementations, the target text node has a first child node including a first portion of the target text string and a second child node including a second portion of the target text string, neither one of the first child node nor the second child node including the entirety of the target text string. The modifying of the markup includes modifying the markup in the first and second child nodes.

In some implementations, identifying the target text node includes searching a first node of the plurality of nodes of the DOM tree to determine presence of the entirety of the target text string therein. Responsive to the first node including the entirety of the target text string, each child node of the first node is searched to determine presence of the entirety of the target text string therein. The first node is assigned to be the target text node responsive to one of: the first node having no child nodes, and the first node having at least one child node, none of the at least one child node of the first node including the entirety of the target text string.

In some implementations, responsive to the target text node having no child nodes, the target text node is modified. Responsive to the target text node having at least one child node, at least one of the at least one child node of the target text node including a portion of the target text string modified, the portion being one of a plurality of portions of the target text string.

In some implementations, each of the at least one child node of the target text node having any one of the plurality of portions of the target text string is modified responsive to the target text node having at least one child node.

In some implementations, responsive to the entirety of the target text string being absent in the first node, a second node of the DOM tree node is searched to determine presence of the entirety of the target text string therein, a corresponding parent node of the second node including the entirety of the text string. Responsive to the second node including the entirety of the target text string, each child node of the second node is searched to determine presence of the entirety of the target text string therein. The second node is assigned to be the target text node responsive to one of: the second node having no child nodes, and the second node having at least one child node, none of the at least one child node of the second node including the entirety of the target text string.

In some implementations, the first node and the second node are sibling nodes.

In some implementations, the target text node is a first target text node corresponding to a first appearance of the target text string in the document, and the document further includes a second appearance of the target text string, the markup being modified to augment presentation of the first appearance of the target text string in the document.

In some implementations, a second target text node corresponding to the second appearance of the target text string in the document is identified, the second target text node including the entirety of the target text string and having no child nodes including the entirety of the target text string. The markup is modified in one of: the second target text node, and a child node of the second target text node including a portion of the target text string. The markup is modified to augment presentation of the second appearance of the target text string in the document.

In some implementations, the target text node is a first target text node corresponding to a first target text string in the document, the markup being modified to augment presentation of the first target text string in the document. The method also includes identifying a second target text node corresponding to a second target text string in the document, the second target text node including the entirety of the second target text string and having no child nodes including the entirety of the second target text string. The markup is modified in one of: the second target text node, and a child node of the second target text node including a portion of the second target text string. The markup is modified to augment presentation of the second target text string in the document.

In some implementations, the document is processed to define the target text string.

In some implementations, processing the document includes obtaining a text-only version of the document.

In some implementations, the target text string is defined based on a pre-defined criteria.

In some implementations, the target text string is defined using a database.

In some implementations, the markup is in HTML.

In some implementations, modifying the markup to augment the presentation of the target text string includes associating a hyperlink with the target text string.

According to another broad aspect of the present technology, there is provided a system for augmenting presentation of text in a document. The system includes a processor, and a communication interface operatively coupled to the processor and configured to receive a document. The processor is configured to cause augmenting of a presentation of the document by obtaining a DOM tree associated with a markup of the document, searching a plurality of nodes of the DOM tree for a target text string such that a child node is searched after searching a corresponding parent node, and identifying a target text node of the DOM tree. The target text node includes an entirety of the target text string and has no child nodes including the entirety of the target text string. Responsive to identifying the target text node, the markup is modified in one of: the target text node, and a child node of the target text node including a portion of the target text string. The markup is modified to augment presentation of the target text string in the document.

In some implementations, the processor is further configured to define the target text string.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" or "electronic device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, a "database" or a "dictionary" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the term "document" refers to any electronic representation of information that can presented to a user or client of the electronic device, at least some of the information being displayed in text format in the document.

In the context of the present specification, the term "markup" refers to an annotated version of the document, the annotations including instructions executable by the application displaying the document. The annotations include instructions for formatting and presentation of different portions of the document. The markup is written in a markup language such as HTML, XML, XHTML, and the like.

In the context of the present specification, the term "Document Object Model Tree" or "DOM tree" refers to a hierarchical representation of the markup including several interconnected nodes. The DOM tree is associated with a markup version of a document, and created by parsing the markup for a document. The DOM tree is created by parsing the markup such that each tag of the markup creates a node, and each tag within the node creates a sub-node or a child node, and so on and so forth.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first node" and "third node" is not intended to imply any particular order, type, chronology, hierarchy or ranking (for example) of/between the nodes, nor is their use (by itself) intended imply that any "second node" must necessarily exist in any given situation. Further, as is discussed herein in other contexts, reference to a "first"

element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
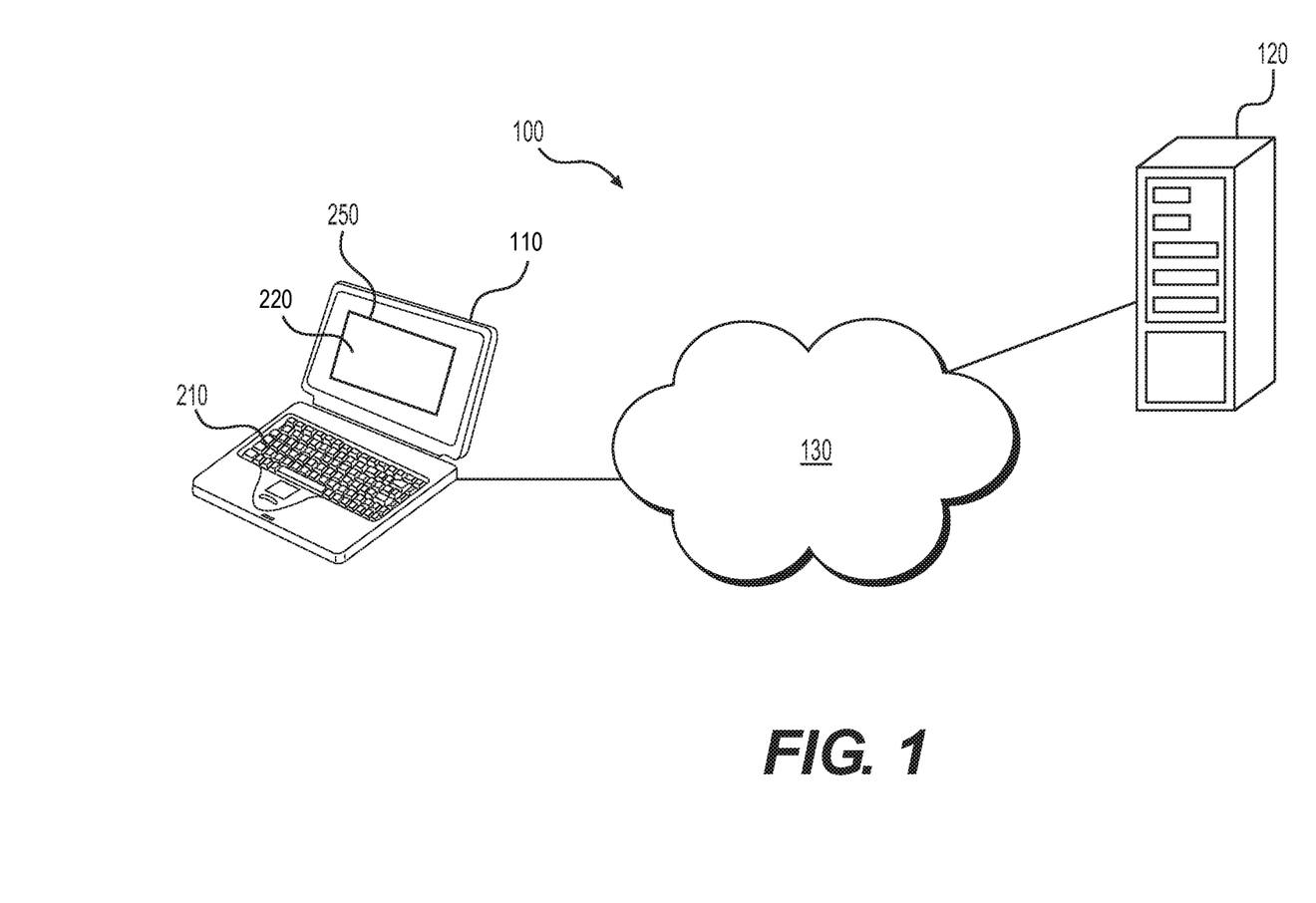
FIG. 1 is a schematic illustration of a network environment in accordance with a non-limiting embodiments of the present technology.

With reference to FIG. 1, there is shown a schematic diagram of a network environment 100 suitable for use with some implementations of the present technology. It should be understood that the network environment 100 is shown herein merely as an illustrative implementation of the present technology. Thus, the description of the network environment that follows is intended to be only a description of illustrative examples of the present technology. This description is not intended to define the scope or set forth the bounds of the present technology.

In some cases, what are believed to be helpful examples of modifications to the network environment 100 may also be set forth below. The modifications are described merely as an aid to understanding, and again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the network environment 100 may provide in certain instances simple implementations of the present technology, and that where such is the case they have been presented in this manner as an aid to understanding. As persons skilled in the art would understand, various implementations of the present technology may be of a greater complexity.

The network environment 100 includes an electronic device 110, a server 120 and a communication network 130. The electronic device 110 communicates with the server 120 via the communications network 130. Although the present description is made with reference to the network environment 100 having one electronic device 110 and one server 120, it should be understood that the network environment 100 could include more than one electronic device 110 and more than one server 120.

Figure 2:
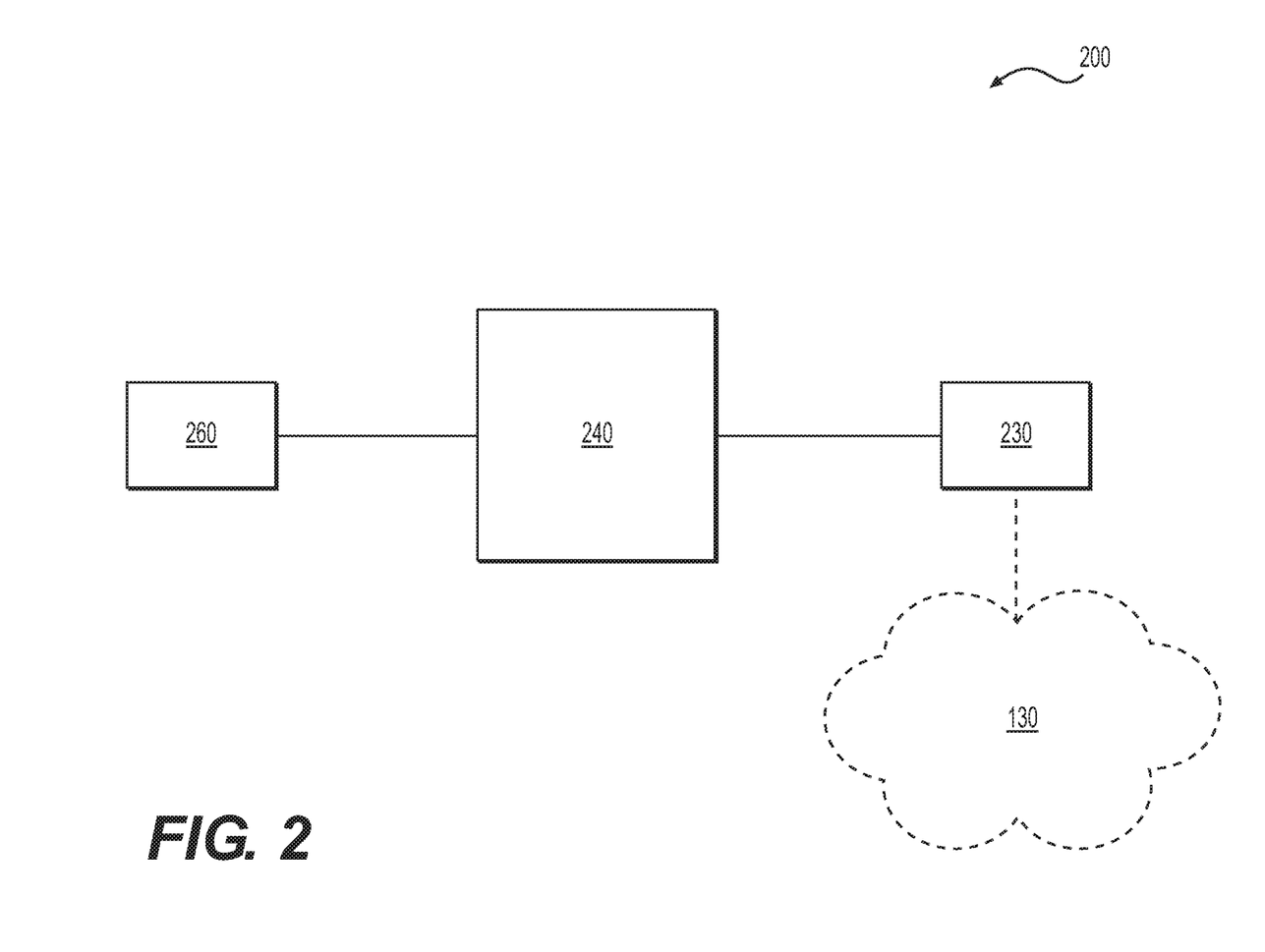
FIG. 2 is a schematic block diagram of a system in accordance with a non-limiting embodiment of the present technology operating in the network environment of FIG. 1.

With reference to FIG. 2, there is shown a system 200 for implementing aspects of the present technology. The system 200 includes a processor 240, a memory 260, and a communication interface 230. The processor 240 includes one or more processing modules such as a single or multi-core processor, and the like. The memory 260 (in the form of a Random Access Memory (RAM), flash memory, or a combination thereof) stores program instructions for execution by the processor 240 for augmenting presentation of text in a document. For example, the program instructions may be part of a library or an application. The processor 240 communicates with the memory 260 to cause execution of various instructions for augmenting presentation of text in a document. The processor 240 is also coupled to the communication interface 230 for communication with other elements of the network environment 100 via the communication network 130. For example, the communication interface 230 could include a radio frequency (RF) transceiver for wireless communication over the communication network 130.

The electronic device 110 is typically associated with a user (not depicted) and, as such, can sometimes be referred to as a "client device". In the illustrated embodiment, the electronic device 110 is a laptop computer. The implementation of the electronic device 110 is however not limited to a laptop computer 110. As an example, the electronic device 110 may be implemented as a personal computer (desktops, laptops, netbooks, etc.), a wireless electronic device (a cell phone, a smartphone, a tablet and the like), as well as network equipment (a router, a switch, or a gateway). The general implementation of the electronic device 110 is known in the art and, as such, will not be described here at much length.

The electronic device 110 includes one or more input devices 210 (such as a keyboard, a mouse, a touch pad, a touch screen, microphone, and the like) for receiving user inputs from a user of the electronic device 110. The electronic device 110 includes one or more output devices 220 (such as a screen, a speaker, a printer and the like) for providing visual, auditory or tactile outputs to the user. The electronic device 110 includes a network communication interface such as the network communication device 230 of FIG. 2 (such as a modem, a network card, and the like) for two-way communication over the communications network 130. The electronic device 110 also includes a processor such as the processor 240 of FIG. 2 coupled to the user input device(s) 210, the user output device(s) 220 and the network communication interface 230. The processor 240 is configured to execute various methods, including those described herein below. To that end the processor 240 may store or have access to computer readable commands which, when executed, cause the processor 240 to execute various instructions including those described below for augmenting the presentation of text in a document 400 as will be described herein. The electronic device 110 comprises hardware and/or software and/or firmware, as is known in the art, to execute various applications.

A browser application 250 is provided on the electronic device 110 to enable a user (not shown) of the electronic device 110 to access one or more network resources via the communication network 130. Examples of browser applications include Google Chrome™ Mozilla Firefox™, Yandex™, and the like. The browser application 250 enables a user of the electronic device 110 to view, create and otherwise interact with various kinds of network resources such as web pages, email messages, streamed audio and video content, and the like. As will be understood, the browser application 250 obtains a network resource, for example a web page or email message, from a host server, such as the server 120, of the network resource and processes the network resource for output to the user of the electronic device 110. For example, a web page is provided to the browser application 250 in the form of a markup 500 (created in a known markup language such as HTML, XML, XHTML, and the like). The markup 500 is then parsed by the processor of the electronic device 110 to enable the browser application 250 to render the web page on the screen 220.

The electronic device 110 also has other applications such as a word processing application, a video viewing application, a music streaming application, a photo sharing application, and the like, some of which may be configured to receive and transmit data via the communication network 130.

In the illustrated implementation of the present technology, the communication network 130 is the Internet. In other implementations of the present technology, the communications network 130 can be other than the Internet, such as a wide-area communications network, a local-area communications network, a private communications network and the like. In the communication network 130, communication occurs over various types of communication links such as wireless links (such as the Wireless Fidelity, or WiFi® for short, Bluetooth® or the like) or wired links (such as a Universal Serial Bus or USB-based connection or Ethernet based connection, for example).

Figure 4:
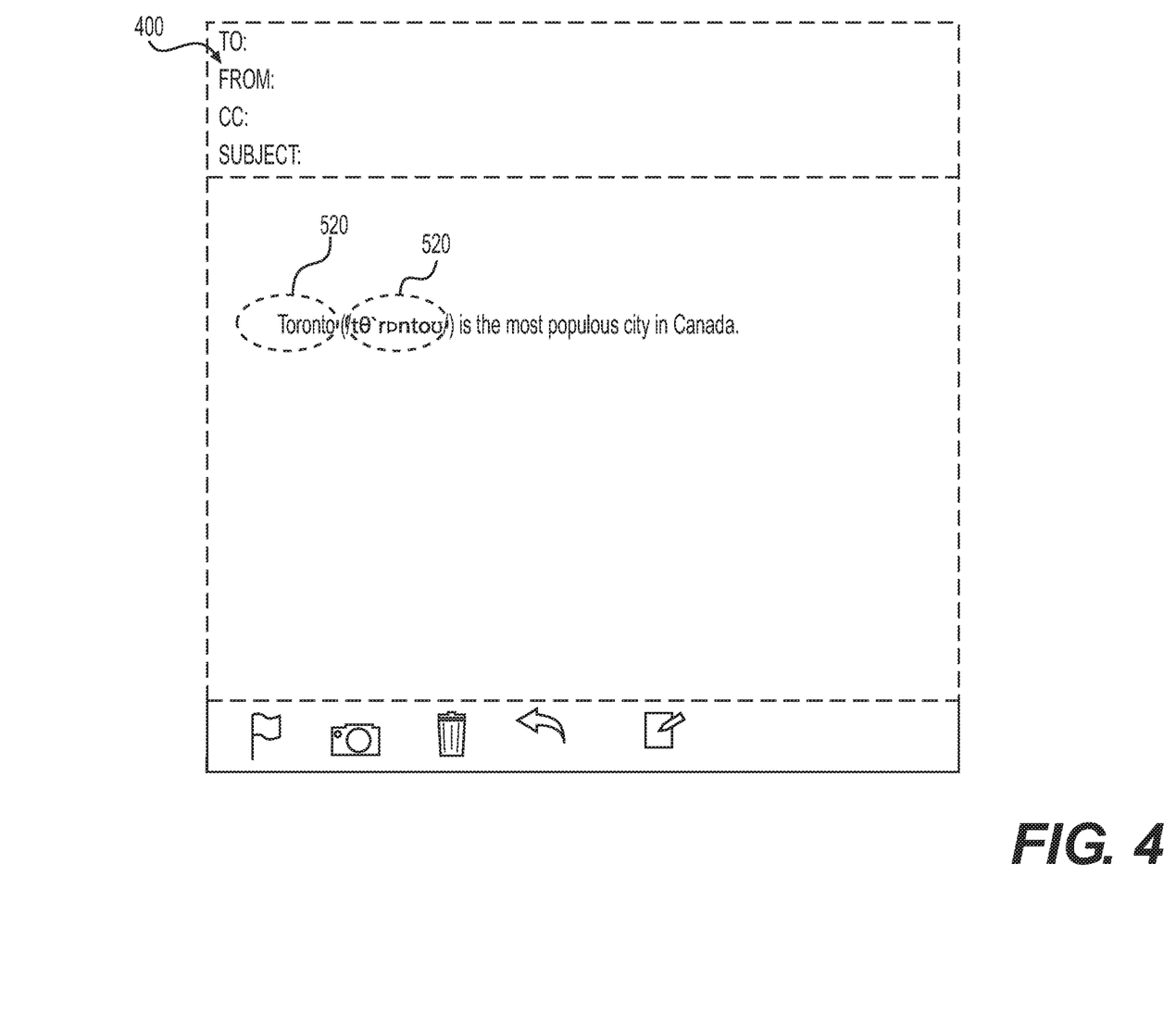
FIG. 4 is an exemplary document that can be modified using the method of FIG. 3.

Also coupled to the communications network 130 is a server 120. In the illustrated implementation, the server 120 is an application server 120 for a webmail application (for example, Gmail™, Yandex Mail™, and the like) for creating, receiving, sending and storing email messages such as the email message 400, a portion of which is shown in FIG. 4. The server 120 is connected to the electronic device 110 via the communication network 130. The server 120 could be connected to a plurality of electronic devices 110. The server 120 could also be connected to other servers 120, such as but not limited to network resource servers, application servers, network configuration servers, via the communication network 130.

The server 120 can be implemented as a conventional computer server. In an example of an embodiment of the present technology, the server 120 can be implemented as a Dell™ PowerEdge™ Server running the Microsoft™ Windows Server™ operating system. The server 120 could also be implemented as other kinds of network equipment such as, but not limited to, a router, a switch, or a gateway, a base station and the like. The server 120 can be implemented in any suitable hardware and/or software and/or firmware, or a combination thereof. In the depicted non-limiting embodiment of present technology, the server 120 is a single server.

In alternative non-limiting embodiments of the present technology, the functionality of the server 120 may be distributed and may be implemented via multiple servers. The implementation of the server 120 is well known. However, briefly speaking, the server 120 comprises a network communication interface such as the network communication interface 230 of FIG. 2 structured and configured to communicate with the electronic device 110 and other devices coupled to the communications network 130. The server 120 further comprises at least one computer processor such as the processor 240 of FIG. 2 operationally connected with the network communication interface 230 and structured and configured to execute various processes for augmenting presentation of text in a document as will be described herein. In some implementations, the server 120 also includes one or more databases (not shown), such as a map database, or a phone directory, and the like. In other implementations, the server 120 could be communicatively coupled to one or more databases via the communication network 130.

Method

A method 300 of augmenting presentation of text in a document 400 will now be discussed with respect to FIGS. 3 to 6.

Figure 3:
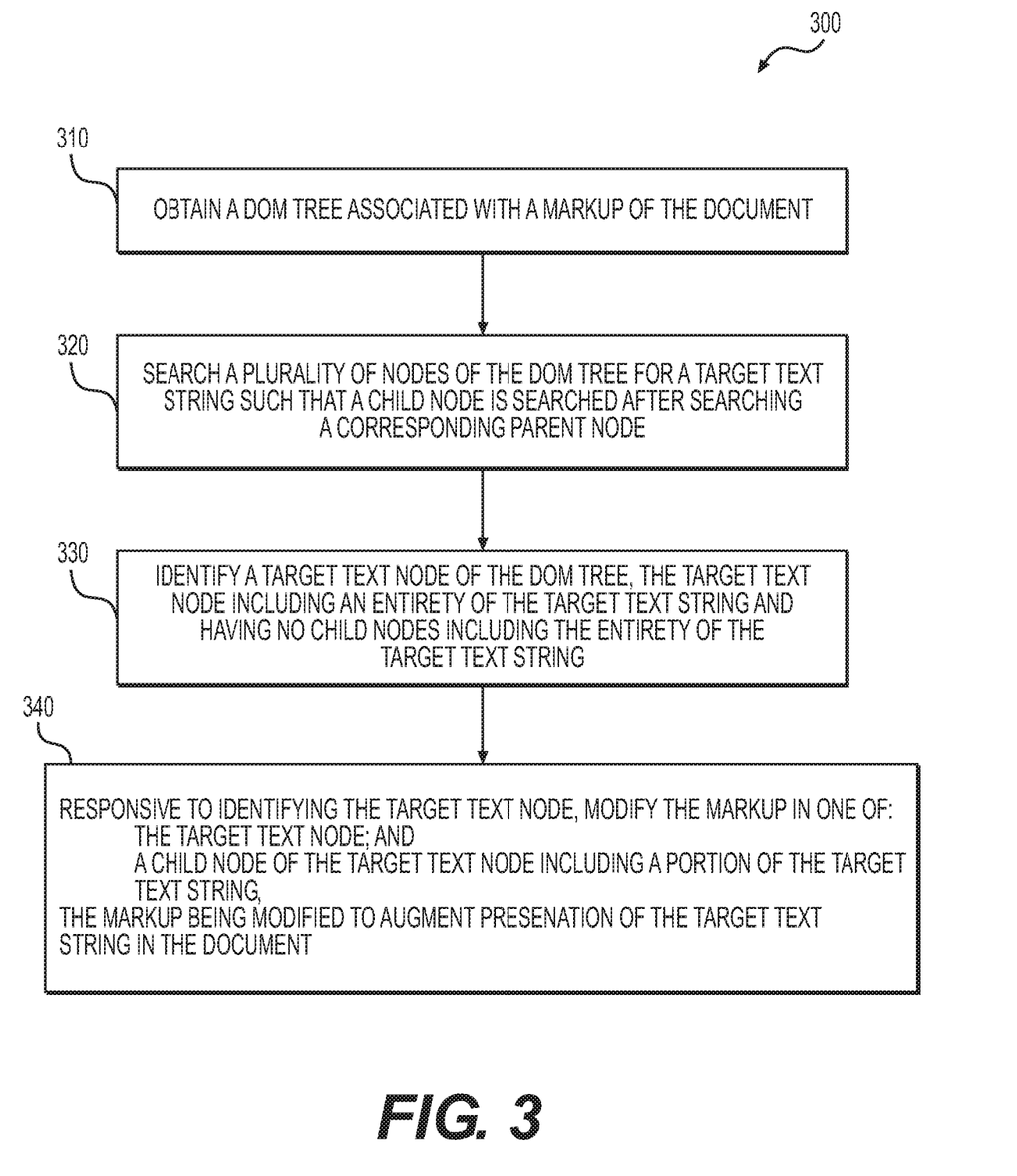
FIG. 3 is a flow chart of a method for augmenting presentation of text in a document according to a non-limiting embodiment of the present technology.
Figure 5:
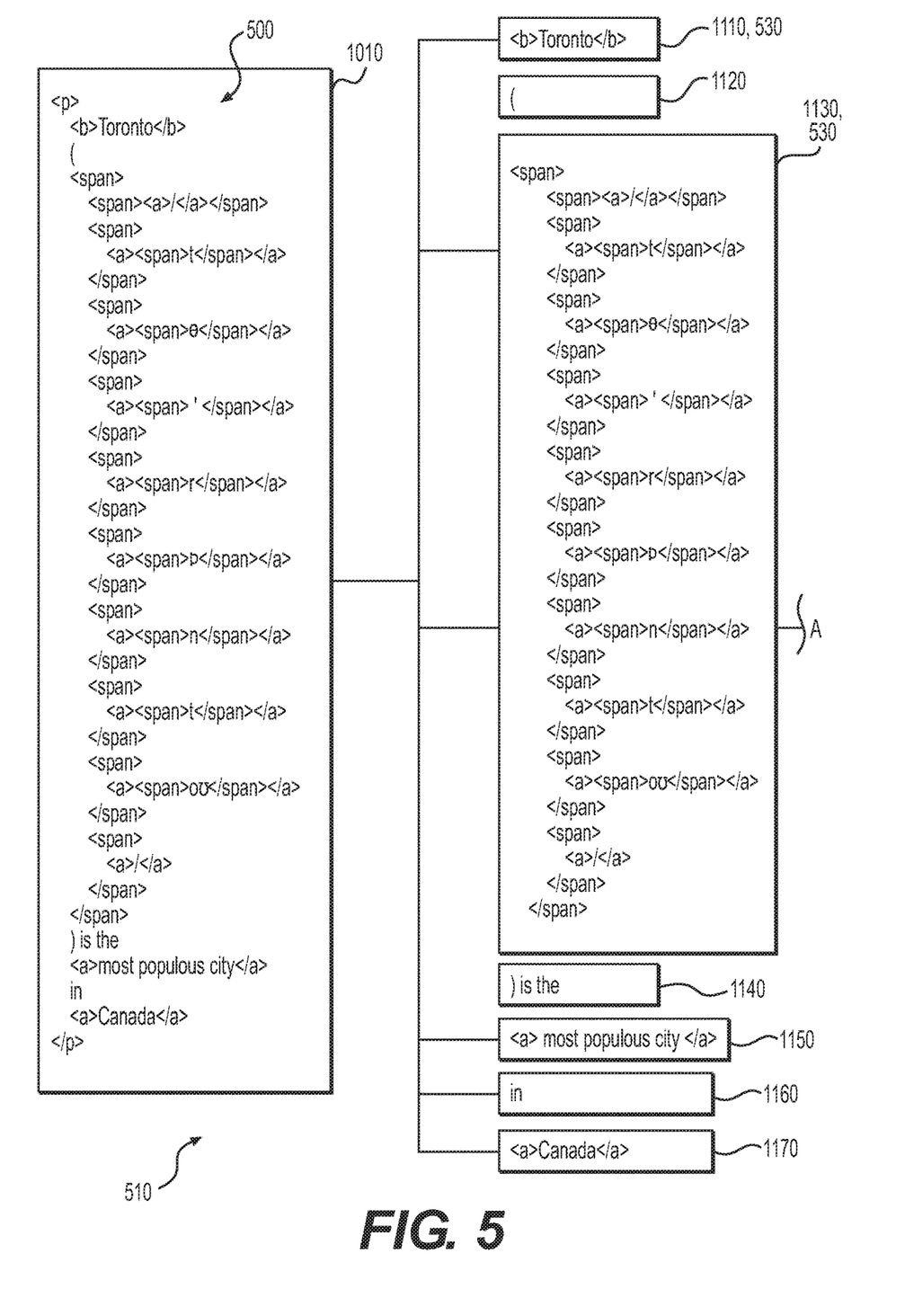
FIG. 5 is an illustration of a first portion of an exemplary DOM tree for the exemplary document of FIG. 4.
Figure 6:
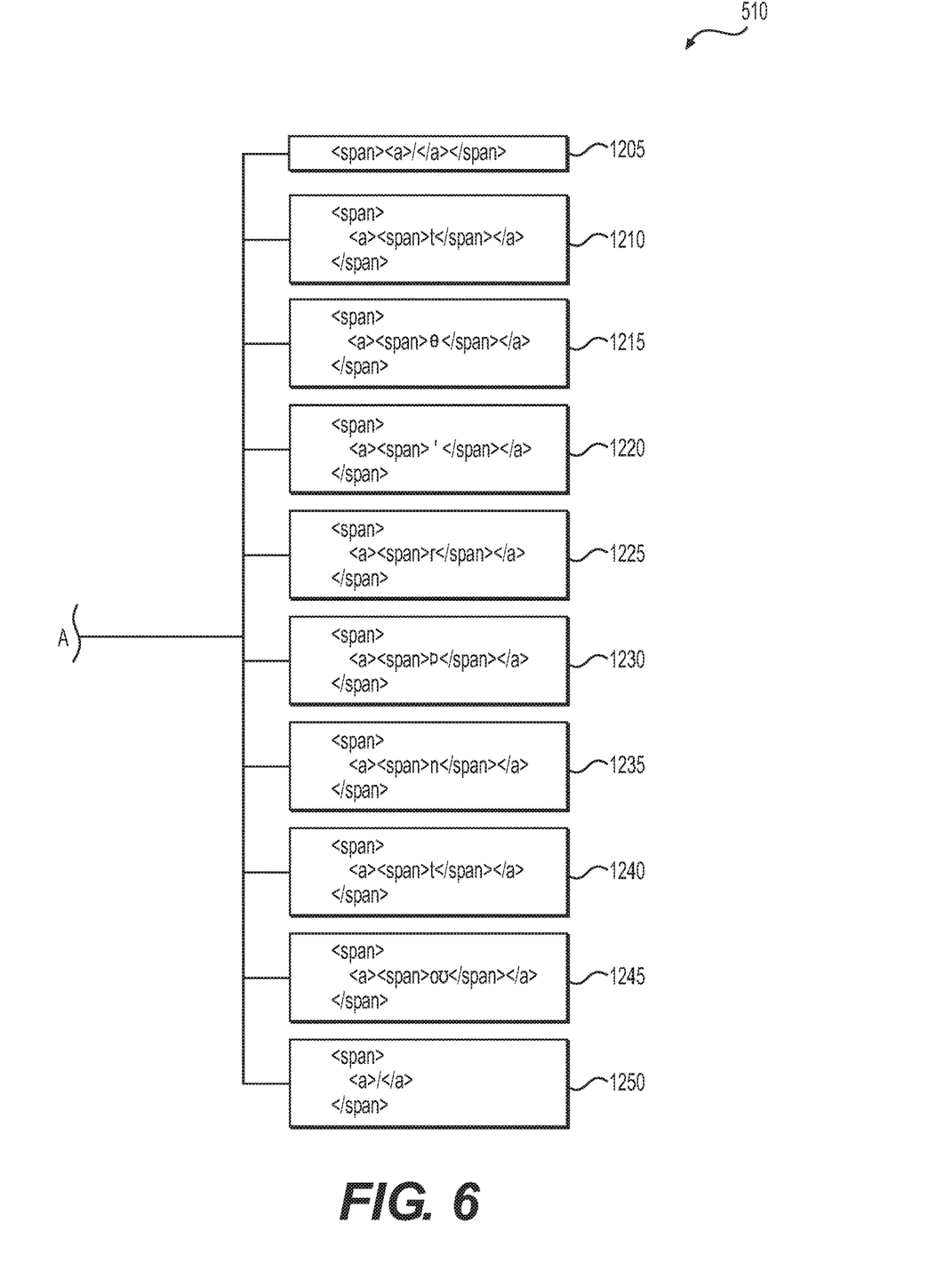
FIG. 6 is an illustration of a second portion of the exemplary DOM tree for the exemplary document of FIG. 4.

FIG. 3 shows the steps 310-340 of the method 300 for augmenting presentation of text in a document 400 in the form of an email message 400, a portion of which is shown in FIG. 4. FIGS. 5 and 6 show a Document Object Model (DOM) tree 510 associated with a markup 500 corresponding to the portion of the text in the email message 400 of FIG. 4.

The method 300 is implemented by the system 200. In some implementations, the system 200 is included in the server 120. The server 120 could be the host server for the webmail application used by a sender of the email message 400 to create the email message 400 or the host for the webmail application used by a receiver of the email message 400 to receive the email message. It is further contemplated, that in some implementations, the method 300 could also be implemented, at least in part, by the processor 240 of the electronic device 110 of the sender and/or receiver of the email message 400.

With reference to FIG. 4, the method 300 will be described with respect to a portion of the email message 400 including the sentence "Toronto ( /təˈrɒntoʊ/ ) is the most populous city in Canada." In a first exemplary scenario, the word " təˈrɒntoʊ " in the portion of the email message 400 is augmented by attaching a link to an audio file of the pronunciation of the name "Toronto". In a second exemplary scenario, the word "Toronto" is augmented by attaching a link of a map of Toronto thereto.

Although the method 300 will be described with respect to augmentation of text in a document 400 in the form of an email message 400, it should be understood that the method 300 can be implemented for augmenting text in other kinds of documents 400 such as web pages, and the like.

With reference to FIG. 3, at step 310 of the method 300 for augmenting presentation of text in the document 400, the DOM tree 510 associated with the markup 500 of the document 400 is obtained.

As can be seen in FIG. 5, in the illustrated implementation, the markup 500 is created in HTML (Hyper Text Markup Language). Although the method 300 is described herein with respect to a markup 500 being created in HTML, it should be understood that the method 300 can be generally applied to a markup 500, written in any markup language, and not to be limited to an HTML markup.

The DOM tree 510 is obtained by parsing the markup 500 as is known in the art. It should be understood that the illustrated DOM tree 510 has been simplified for convenience of the description of the method 300 below and is not intended to limit the scope of the method 300 described below. The DOM tree 510 shown in FIGS. 5 and 6 is only intended to be illustrative. It should be understood that the DOM tree 510 corresponding to the portion of the email message 400 of FIG. 4 could be different than as shown herein. For example, the DOM tree 510 could have additional branches, nodes, elements, tags, and the like, than as shown herein.

With reference to FIGS. 5 and 6, the portion of the DOM tree 510 corresponding to the exemplary document portion 400 of FIG. 4 includes nodes 1010, 1110, 1120, 1130, 1140, 1150, 1160, 1170, 1205, 1210, 1215, 1220, 1225, 1230, 1235, 1240, 1245, and 1250. The node 1010 is a parent node having seven child nodes 1110, 1120, 1130, 1140, 1150, 1160, 1170. The node 1130 is in turn a parent node for the ten child nodes 1205, 1210, 1215, 1220, 1225, 1230, 1235, 1240, 1245, and 1250. The parent node 1010 is the root node for this portion of the DOM tree 510 and includes the entirety of the portion of the markup 500 corresponding to the portion of the document 400 of FIG. 4. The child nodes 1110-1170 include subsets of the portion of the markup 500 corresponding to the portion of the document 400 of FIG. 4.

At step 320, the method 300 searches a plurality of nodes of the DOM tree 510 for a target text string 520. For the first exemplary scenario, the target text string 520 is "tɘˈrɒntoʊ". For the second exemplary scenario, the target text string 520 is "Toronto". The target text string 520 can include any combination of letters, numbers and symbols, generally any type of character that can be entered by a user of an electronic device 110 or displayed on the display screen 220 to the user of the electronic device 110.

The target text string 520 is defined based on predefined criteria and using one or more databases or dictionaries. The target text string 520 is determined by processing the document 400. In some implementations, the processing of the document 400 includes obtaining a text-only version of the document 400. In some implementations, the document 400 may be analyzed for semantic information, contextual information, and the like. For example, the pre-defined criteria for the target text string 520 could be a city name, an address, a telephone number, and the like. The target text string 520 according to the predefined criteria could be identified in a text-only version of the document 400 by applying thereto a mask or template for the predefined criteria (telephone number or address for example) obtained from dictionaries and/or databases. The dictionaries and/or databases may be stored locally at the server 120 or electronic device 110 where the method 300 is being implemented, or stored remotely at a different server 120 that may be accessed over the communication network 130. The method 300 is however not to be limited to any particular means for determining a target text string 520.

At step 320, the plurality of nodes 1010-1250 are searched for the presence of the target text string 520 in a top-down direction. Thus, a parent node 1010, 1130 is searched before searching the corresponding child nodes 1110-1170, 1205-1250 thereof. In the exemplary DOM tree 510, the parent node 1010 is searched prior to searching the child nodes 1110-1170, and the child nodes 1205-1250 are searched after searching the corresponding parent node 1130.

In searching the nodes 1010-1250, the search proceeds from a parent node (1010, for example) that includes the entirety of the target text string 520 to a first child node (1110, for example). If the first child node does not include the entirety of the text string 520, the search proceeds to a second child node 1120 (i.e. a sibling of the first child node 1110). If the first child node 1110 includes the entirety of the text string 520, the search also proceeds to child nodes of the first child node 1110, if any.

Thus, the root node 1010 is first checked to verify if it includes the entirety of the target text string 520. If the root node 1010 includes the entirety of the target text string 520, each of the child nodes 1110-1170 of the root node 1010 is checked to verify the presence of the entirety of the target text string 520, or a portion thereof. If the root node 1010 is determined to not include the entirety of the target string 520, then the method 300 does not search any of the child nodes 1110-1170, or the grandchild nodes 1205-1250. The region of search in the DOM tree 510 is thus narrowed down by only searching the child nodes of a parent node that includes the entirety of the target text string 520.

In the first exemplary scenario, a search of the root node 1010 shows that the target text string 520 "tɘˈrɒntoʊ" is included therein and therefore, the child nodes 1110-1170 are each searched for the entirety of the target text string 520 "tɘˈrɒntoʊ", or a portion thereof.

In the second exemplary scenario, a search of the root node 1010 shows that the target text string 520 "Toronto" is included therein and therefore, the child nodes 1110-1170 are each searched for the entirety of the target text string 520 "Toronto", or a portion thereof.

The presence of the entirety of the target text string 520 in a node 1010-1250 of the DOM tree 510 implies that each character of the target text string 520 appears in the text of the node 1010-1270 in the same order in which it appears in the target text string 520, but neighboring characters of the target text string 520 may be separated in the node 1010-1250 by one or more other characters that are not part of the target text string 520. For example, the node 1110 includes all the characters of the target text string 520 "Toronto" without any of the neighboring characters being separated by non-target text characters. As another example, the node 1130 includes all the characters of the target text string 520 "tɘˈrɒntoʊ" but in this case, the neighboring characters, for example, "t" and "θ" of the text string 520 are found in the node 1130 separated by other characters that are not part of the target text string 520. In both cases, the node 1110 and 1130 includes the entirety of a target text string 520, "Toronto" and "tɘˈrɒntoʊ", respectively.

The search for the entirety of the target text string 520 in the text of any of the nodes 1010-1250 is performed character by character. For example, for searching the root node 1010, the first character "t" of the target text string 520 "tɘˈrɒntoʊ" is compared to each character in the text of the node 1010 starting from the first character of the node 1010. When a match is found for the first character of the target text string 520, the second character "θ" of the target text string 520 is selected for comparison with the text in the node 1010, starting from the position after the match for the first character of the target text string 520, and so on and so forth, until all the text of the node 1010 has been searched, or until all the characters of the target text string 520 have been matched.

Thus, for the exemplary DOM tree 510, the root node 1010 includes all of the characters of the target text string 520 "tɘˈrɒntoʊ". The first character "t" of the target text string 520 "tɘˈrɒntoʊ" is found in the child nodes 1110, 1130, 1140 and 1150 while the second character "θ" of the target text string 520 is found only in the child node 1130. Only the node 1130 will therefore be searched for the remaining characters of the target text string 520 "tə'rɒntoʊ".

It is also contemplated that the searching of nodes 1010-1250 for the presence of the characters of the target text string 520 could be designed taking into account the possibility of errors and/or discrepancies, such as typographical errors in the document 400. For example, multiple target text strings 520 with alternate spellings of a particular city name could be defined. As another example, the searching of the nodes 1010-1250 for the presence of the target text string 520 could take into account that pairs of characters of the defined target text string 520 could be reversed in position in the document 400 and/or the corresponding nodes 1010-1250 of the DOM tree.

At step 330, a target text node 530 is identified. The target text node 530 is defined such that the entirety of the target text string 520 is included within the target text node 530, but none of the child nodes of the target text node 530 include the entirety of the target text string 520. The target text node 530 is the last common node for all of the characters of the target text string 520 in a branch of the DOM tree 510.

In the first exemplary scenario using the exemplary target text string 520 "tə'rɒntoʊ", the target text node 530 is identified to be the node 1130 which includes all the characters of the target text string 520 "tə'rɒntoʊ". None of the child nodes 1205-1250 of the node 1130 include all of the characters of the exemplary target text string 520 "tə'rɒntoʊ".

In the second exemplary scenario where the target text string 520 is "Toronto", the target text node 530 is identified to be the node 1110 since the node 1110 includes all of the characters of the target text string 520 "Toronto", and the node 1110 does not have any child nodes, thus ensuring that none of the child nodes of the target text node 1110 include the entirety of the target text string 520 "Toronto".

As another example, for a target text string 520 such as "Center Street", the target text node 530 could be a node that included the word "Center" followed by one or more characters that are not part of the target text string 520 and then the word "Street", and none of whose child nodes include both words "Center" and "Street". The target text node 530 for this example target text string 520 "Center Street" could also be a node that included "Center Street", none of whose child nodes included both "Center" and "Street", or any other subsets thereof that would in sequence add up to "Center Street".

At step 340, responsive to the target text node 530 having been identified at step 330, the markup 500 is modified either in the target text node 530 or in at least one of the child nodes of the target text node 530 that includes a portion of the target text string 520.

For example, the markup 500 can be modified, as mentioned above, to add a hyperlink to the target text string 520, to attach a downloadable document to the target text string 520, to color, highlight, underline or otherwise change the format or visual presentation of the target text string 520, and the like. The method 300 is not to be limited to any specific type of modification of the markup 500 or for any specific type of augmentation of the target text string 520.

In the first exemplary scenario, eight nodes 1210-1245 of the ten child nodes 1205-1250 of the target text node 1130 each include a portion of the target text string 520 "tə'rɒntoʊ", and the markup 500 is modified in each one of these eight child nodes 1210-1245. The child nodes 1205, 1250 that do not include any portion of the target text string 520 "tə'rɒntoʊ" remain unmodified. In some implementations, the markup 500 is modified in only one of the eight child nodes 1210-1245 that include a portion of the target text string 520 "tə'rɒntoʊ".

In the second exemplary scenario, the markup 500 is modified in the target text node 530, 1110.

In some implementations of the method 300, only one instance of an appearance of the target text string 520 is augmented. In this case, in some implementations, the searching of nodes 1010-1250 for the target text string 520 ends upon identification of a first target text node 530 corresponding to a first appearance of the target text string 520 in the document 400. In this case, only a subset of the child nodes 1110-1170 of the root node 1010 may be searched for the target text string 520. The child nodes 1110-1170 may be searched in order from the first 1110 to the second 1120 and so on until a first target text string 520 is found. In some implementation, the subset of child nodes 1110-1170 of the root node 1010 to be searched may be narrowed in other ways, for example by determining whether the target text string is expected to appear before or after a particular one of the child nodes 1110-1170.

In some implementations of the method 300, only one instance of an appearance of the target text string 520 is augmented, but the searching of the child nodes 1110-1170 continues until all of the target text nodes corresponding to each of the appearances of the target text string 520 in the document 400 have been accounted for. Once all the appearances of the target text string 520 have been identified, one of the appearances of the target text string 520 is selected for augmentation. The particular appearance of the target text string 520 that is selected for augmentation may be based on the convenience of modification of the markup 500 corresponding to that appearance of the target text string 520. For example, a node selected for modification of the markup 500 therein could be a child node of the target text node 530 that includes very little content other than a portion of the target text string 520. A modification of the markup 500 in such a node having less text than in a node having more text (elements, tags, attributes, text, and the like) would have a smaller probability of accidental or unintentional modifications of the markup, and the resulting presentation of the document 400. It is also contemplated that the selection of one of several appearances of the target text string could be based on the suitability of that appearance of the target text string 520. For example, a particular appearance of the target text string 520 could be selected for augmentation based on its location in the document 400 being central and prominent in the document 400.

In some implementations of the method 300, each instance of an appearance of the target text string 520 is augmented. In this case, all of the target text nodes 530 (each node corresponding to one of the target text strings 520) are identified in the DOM tree 510. For each of the identified target text nodes 530, the markup 500 is amended either in the target text node 530 or at least one of the child nodes thereof that include at least a portion of the target text string 520. In this case, the searching of child nodes 1110-1170 proceeds from one sibling node 1110 of the root node 1010 to another sibling node 1120 until all the child nodes 1110-1170 of the root node 1010 have been searched. It is contemplated that in some implementations, the number of appearances of the target text string 520 in the document 400 may first be determined and used to reduce, limit or narrow the searching of the nodes 1010-1250. For example, the root node 1010 may be indicative of the number of appearances of the target text string 520, or the number of appearances of the target text string 520 could be determined by processing the text version of the document 400. In this case, the searching of child nodes 1110-1170 proceeds from one sibling node 1110 of the root node 1010 to another sibling node 1120 until the number of appearances of the target text string 520 determined from the root node 1010 have been accounted for.

In some implementations, a plurality of target text strings 520, each target text string 520 being different from the others, are augmented in the document 400. In this case, the nodes 1010-1270 of the DOM tree 510 would be searched for each one of the target text strings 520, and for each target text string 520, at least one target text node 530 (corresponding to at least one appearance of the corresponding target text string 520 in the document 400) will be identified.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of modifying visual presentation of a text of a document, the text comprising a plurality of text strings, the plurality of text strings including a target content text string to be visually modified, the target content text string comprising a set of characters, and one or more additional text strings, the document to be displayed on a display of an electronic device, the method being executable at a server and comprising:
   determining the target content text string to be visually modified in the text of the document;
   obtaining a Document Object Model (DOM) tree associated with a markup of the document, the DOM tree including a plurality of nodes, each node of the plurality of nodes including a content portion and a syntax portion, the syntax portion containing at least one tag, the plurality of nodes including a plurality of parent nodes and a plurality of child nodes, at least some parent nodes of the plurality of parent nodes having a corresponding at least one child node of the plurality of child nodes;
   identifying a target text node in the plurality of nodes of the DOM tree by searching the content portions of the plurality of nodes for an entirety of the target content text string being present therein, the searching comprising:
      identifying a first node of the plurality of nodes of the DOM tree containing the entirety of the target content text string therein by searching the plurality of nodes in the DOM tree beginning at a root node of the DOM tree; and
      after identifying the first node:
         determining that none of the respective child nodes of the first node contains the entirety of the target content text string therein by searching each child node of the first node; and
         assigning the first node to be the target text node after determining that none of the respective child nodes contains the entirety of the target content text string therein; and
   responsive to identifying the target text node:
      dividing the target text string into a plurality of portions,
      determining one or more child nodes of the target text node, and
         determining that each portion of the plurality of portions corresponds to at least one child node of the one or more child nodes by comparing each portion of the plurality of portions to the one or more child nodes;
      modifying the markup in one of: the target text node and a child node of the target text node having a content portion which includes a portion of the target content text string, the modifying including modifying a visual presentation of the target content text string on the display of the electronic device; and
      displaying a modified document comprising the modified visual presentation of the target content text string, based on the modified markup, together with the one or more additional text strings, on the electronic device.

2. The method of claim 1, wherein:
the target text node has a second child node including a second content portion of the target content text string; and
wherein said modifying the markup comprises modifying the markup in the child node of the target text node having the content portion and the second child node including the second content portion.

3. The method of claim 1, further comprising:
responsive to the target text node having no child nodes, modifying the target text node; and
responsive to the target text node having at least one child node, modifying the child node of the target text node having the content.

4. The method of claim 3, wherein:
each of the at least one child node of the target text node having any one of the plurality of portions of the target content text string is modified responsive to the target text node having at least one child node.

5. The method of claim 1, wherein:
the target text node is a first target text node corresponding to a first appearance of the target content text string in the document, the document further comprising a second appearance of the target content text string, the markup being modified to modify visual presentation of the first appearance of the target content text string in the displayed document.

6. The method of claim 5, further comprising:
identifying a second target text node corresponding to the second appearance of the target content text string in the document, the second target text node including the entirety of the target content text string and having no child nodes including the entirety of the target content text string; and
modifying the markup in one of:
the second target text node; and
a child node of the second target text node including a portion of the target content text string,
the markup being modified to modify visual presentation of the second appearance of the target content text string in the displayed document.

7. The method of claim 1, wherein:
the target text node is a first target text node corresponding to a first target content text string in the document, the markup being modified to modify visual presentation of the first target content text string in the document, the method further comprising:
identifying a second target text node corresponding to a second target content text string in the document, the second target text node including the entirety of the second target content text string and having no child nodes including the entirety of the second content text string; and
modifying the markup in one of:
the second target text node; and
a child node of the second target text node including a portion of the second target content text string, the markup being modified to modify visual presentation of the second target content text string in the document.

8. The method of claim 1, further comprising:
processing the document to determine the target content text string.

9. The method of claim 8, wherein:
processing the document comprises obtaining a text-only version of the document.

10. The method of claim 8, wherein the target content text string is defined based on a pre-defined criteria.

11. The method of claim 8, wherein the target content text string is defined using a database.

12. The method of claim 1, wherein the markup is in HTML.

13. The method of claim 1, wherein modifying the markup to modify the visual presentation of the target content text string comprises associating a hyperlink with the target content text string.

14. A system for modifying visual presentation of a text of a document, the text comprising a plurality of text strings, the plurality of text strings including a target content text string to be visually modified, the target content text string comprising a set of characters, and one or more additional text strings, the document to be displayed on a display of an electronic device, the system comprising:
a processor; and
a communication interface operatively coupled to the processor and configured to receive a document, the processor being configured to cause modifying of a presentation of the document, the processor being configured to:
determine the target content text string to be visually modified in the text of the document;
obtain a Document Object Model (DOM) tree associated with a markup of the document, the DOM tree including a plurality of nodes, each node of the plurality of nodes including a content portion and a syntax portion, the syntax portion containing at least one tag, the plurality of nodes including a plurality of parent nodes and a plurality of child nodes, at least some parent nodes of the plurality of parent nodes having a corresponding at least one child node of the plurality of child nodes;
identifying a target text node in the plurality of nodes of the DOM tree by searching the content portions of the plurality of nodes for an entirety of the target content text string being present therein, the searching comprising:
identifying a first node of the plurality of nodes of the DOM tree containing the entirety of the target content text string therein by searching the plurality of nodes in the DOM tree beginning at a root node of the DOM tree; and
after identifying the first node:
determining that none of the respective child nodes of the first node contains the entirety of the target content text string therein by searching each child node of the first node; and
assigning the first node to be the target text node after determining that none of the respective child nodes contain the entirety of the target content text string therein; and responsive to identifying the target text node:
dividing the target text string into a plurality of portions, determining one or more child nodes of the target text node, and determining that each portion of the plurality of portions corresponds to at least one child node of the one or more child nodes by comparing each portion of the plurality of portions to the one or more child nodes;
modifying the markup in one of: the target text node and a child node of the target text node having a content portion which includes a portion of the target content text string, the modifying including modifying a visual presentation of the target content text string on the display of the electronic device; and
displaying, a modified document comprising the modified visual presentation of the target content text string, based on the modified markup, together with the one or more additional text strings, on the electronic device.

15. The system of claim 14, wherein: the processor is further configured to process the document to define the target content text string.

* * * * *